United States Patent

[11] 3,591,011

| [72] | Inventors | Heinz Hölter<br>Hochstrasse 37;<br>Heribert Dewart, Bahnhofstrasse 23, both<br>of 4390 Gladbeck, Germany |
|------|-----------|---|
| [21] | Appl. No. | 865,857 |
| [22] | Filed | Oct. 13, 1969 |
| [45] | Patented | July 6, 1971 |
| [32] | Priority | Apr. 29, 1969 |
| [33] | | Germany |
| [31] | | P 19 21 785.7 |

[54] APPARATUS FOR SEPARATING SOLID PARTICLES FROM A FLUID MEDIUM
11 Claims, 2 Drawing Figs.

[52] U.S. Cl. ................................... 210/512,
55/396
[51] Int. Cl. ................................... B01d 21/26
[50] Field of Search ........................... 210/304,
433, 512; 209/144, 24; 55/396, 456, 457

[56] References Cited
UNITED STATES PATENTS
| 379,009 | 3/1888 | DeRycke | 55/457 X |
| 2,193,883 | 3/1940 | Reeves | 55/396 X |
| 2,806,551 | 9/1957 | Heinich | 55/456 X |

Primary Examiner—J. L. DeCesare
Attorney—Michael S. Striker

ABSTRACT: An elongated separation chamber for conducting a fluid medium and having a peripheral wall with discharge openings provided in this wall. A motion imparting member is arranged in the region of the inlet of the separation chamber and is operative to cause the fluid medium to move within the separation chamber along a helical path towards the outlet of the chamber so that solid particles suspended in the fluid medium are moved along and against the peripheral wall and are thereby forced through the discharge openings in the wall while the fluid medium is discharged via the outlet of the chamber.

PATENTED JUL 6 1971

3,591,011

INVENTOR
HEINZ HÖLTER
BY HERIBERT DEWERT

Nathael S. Stolze
ATTORNEY

APPARATUS FOR SEPARATING SOLID PARTICLES FROM A FLUID MEDIUM

BACKGROUND OF THE INVENTION

The present invention relates to an apparatus for separating solid particles from a liquid medium and, in particular to such an apparatus especially adapted for the removal of dust in underground mining.

At the present time, water-jet scrubbers are often used in underground mining. In these water-jet scrubbers water is utilized to wash out the dust. Such type scrubbers usually are combined with cyclone-type cleaners and cleaners incorporating a liquid bed while, in addition, and for the purpose of recovery of pressure, quite often exhaust diffusers are arranged after the actual water separators.

Such known type constructions are quite expensive and, in addition, are extremely complicated and voluminous.

SUMMARY OF THE INVENTION

It therefore is an object of the present invention to provide a relatively small-sized apparatus which on the one hand provides a favorable pressure recovery and on the other hand separates solid particles from a fluid medium.

Such an apparatus according to the present invention comprises an elongated separation chamber having a peripheral wall and opening means provided in this peripheral wall. Motion imparting means are arranged in the region of an inlet of the separation chamber for causing a fluid medium having solid particles suspended therein and introduced into the chamber via the inlet, to move within the chamber along a substantially helical path towards an outlet of the chamber and so that the solid particles present in the fluid medium are moved along and against the peripheral wall and thereby forced through the opening means therein while the fluid medium is discharged through the outlet of the chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
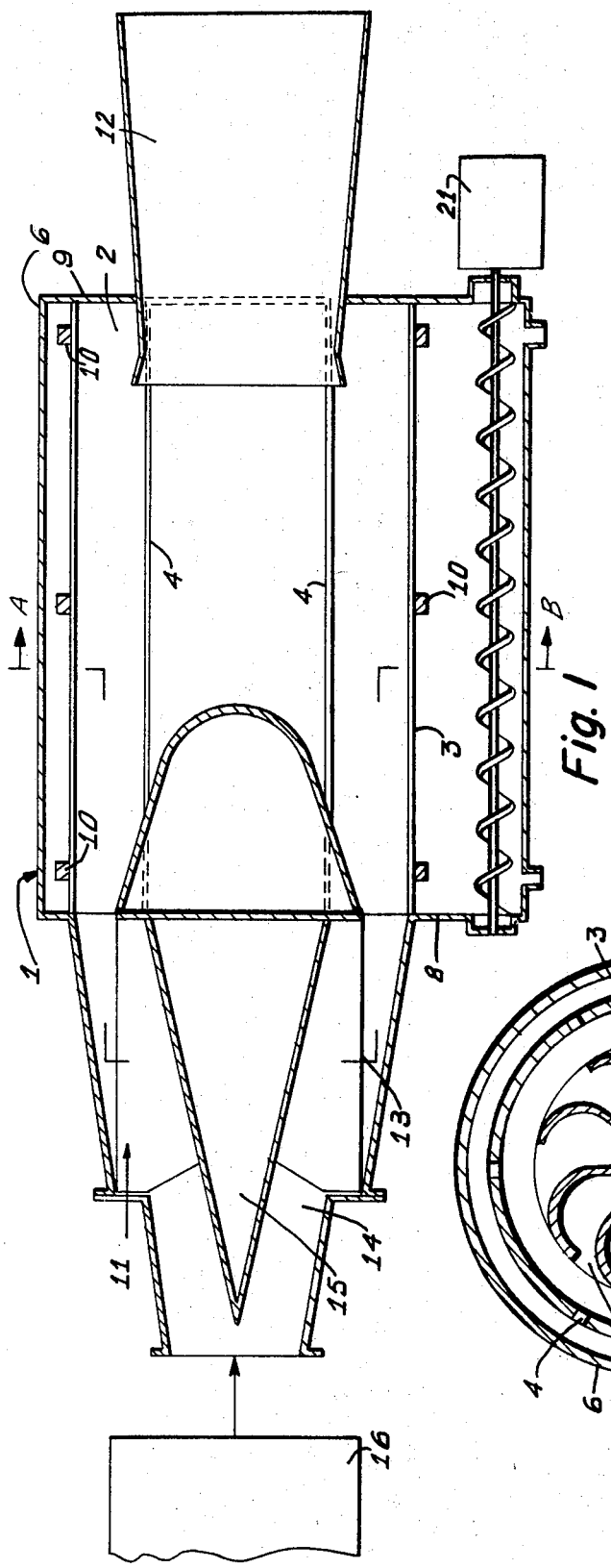
FIG. 1 is a longitudinal cross-sectional view of an apparatus for separating solid particles from a fluid medium, according to the present invention.
Figure 2:
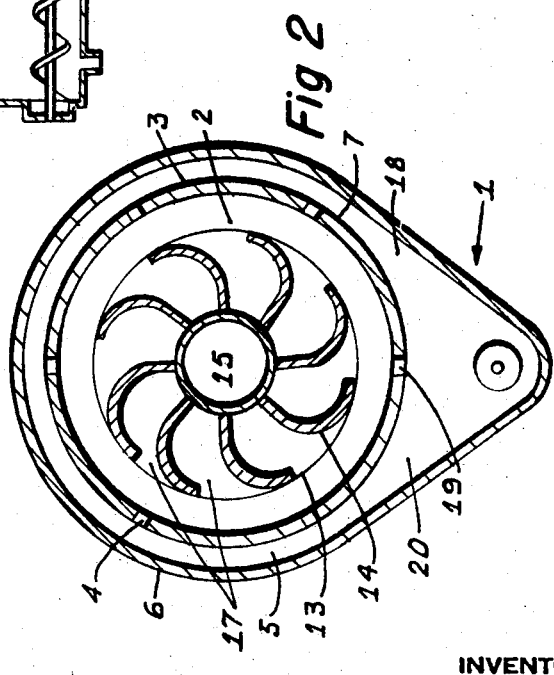
FIG. 2 is a transverse cross-sectional view of the apparatus of FIG. 1, taken along the lines A-A and B-B.

Referring now to the drawing in which like reference numerals index like parts, the apparatus for separating solid particles from a fluid medium, shown in FIGS. 1 and 2 and generally indicated at 1, is seen to comprise an elongated but substantially short separation chamber 2 which has a peripheral wall 3 in which a plurality of slots 4 are circumferentially arranged. The slots 4 extend in the direction of elongation of the separation chamber 2 and communicate the latter with a second annular chamber 5 which surrounds the chamber 2 and is defined by the peripheral wall 3 and a second outer wall 6.

The inner separation chamber 2 is seen to be constituted by a plurality of part-circular segments 7, FIG. 2, which at their front end are welded to a front wall 8, FIG. 1, of the chamber and at the rear end are welded to a rear wall 9, FIG. 1, of the chamber.

In addition, annular band-shaped strips or rings 10 are connected to and tightly encircle the wall 3 so as to reinforce the latter and to keep the discrete segments 7 in their respective positions relative to the elongated slots 4.

As shown, the strips or rings 10 extend in direction transversely relative to the elongation of the chamber 2 and are positioned in the second annular chamber 5.

Arranged at the front end of the chamber 2, in the region of its front wall 8, FIG. 1 is an inlet portion 11 which communicates with the chamber 2 while an outlet portion 12 is provided through the rear wall 9 of the chamber 2.

Arranged in the inlet portion 11, and fixedly connected therein, is a stationary motion imparting arrangement, generally indicated at 13, which is fixedly connected in the inlet portion 11 and is operative to impart a helical motion to a gaseous or fluid medium entering the chamber 2 via inlet portion 11.

The arrangement 13 is seen to comprise a plurality of helical vanes 14 and a cone-shaped guide member 15. The helical vanes 14 project radially from the cone-shaped circumference of the guide member 15 and are equally spaced relative to each other and are unitarily formed with the guide member 15.

A dust-laden fluid medium M emanating from a source 16, FIG. 1, and entering the inlet portion 11, initially impinges on the guide member 15 formed in the inlet portion 11, and which subsequently guides this medium into engagement with the helical vanes 14 which forces the medium to flow radially outwardly into the direction indicated at 17, FIG. 2, and into the separation chamber 2 where it moves along a helical path in the direction towards the outlet 12. The fluid medium, including dust, in the form of solid particles, is forced along and slung against the peripheral wall 3 of the chamber 2 so that the solid particles present in the medium, due to their weight, are separated from this medium and are forced through the slots 4 into the outer annular chamber 5.

Once in the annular chamber 5, the solid particles thus separated from the fluid medium, are conducted by the chamber 5 into a collecting reservoir 18 which forms a part of the annular chamber 5, and is formed at the lower end thereof.

As clearly shown in FIG. 2, each of the elongated slots 4, communicates with the reservoir 18 via the annular passage provided by the annular chamber 2, with the exception of course of the lowermost slot 19 which directly communicates with the reservoir 18.

The fluid medium, cleaned from dust or solid particles throughout the elongation of the chamber 2, continues to flow towards the outlet 12 and is subsequently expelled therethrough.

Provided in the collecting reservoir 18, is a worm conveyor 20 which serves to discharge the solid particles from the reservoir 18.

The worm conveyor 20 may be electromechanically driven by a motor 21.

Instead of a conveyor, a discharge pump or any other conventional means may be utilized to discharge the solid particles from the reservoir 18.

From the above description of the subject apparatus for separating solid particles from a fluid medium, which in the preferred embodiment of the invention, is relatively small and compact, it will be understood that a suitable pressure recovery is obtained by means of the stationary arrangement of the equidistant helical vanes 14 and the guide member 15.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What We claim as new and desire to be protected by Letters Patent is set forth in the appended claims.

1. Apparatus for separating solid particles from a fluid medium, comprising, in combination, an elongated separation chamber having a peripheral wall provided with a plurality of circumferentially spaced elongated slots extending in the direction of the elongation of said separation chamber, said separation chamber having an inlet portion at one end and an outlet at the other end thereof; means for introducing a fluid medium having solid particles suspended therein through said inlet portion of said separation chamber into the latter; motion imparting means arranged in said inlet portion for causing said fluid medium to move within said elongated separation chamber along a substantially helical path toward said outlet so that said solid particles present in said fluid medium are moved along and against said peripheral wall and pass through said elongated slots therein while said fluid medium will flow through said separation chamber and leave the same through said outlet thereof; and jacket means surrounding said peripheral wall and defining therewith an annular clearance with which said elongated slots communicate.

2. Apparatus as defined in claim 1, wherein said elongated separation chamber is in the form of a cylinder of uniform diameter and wherein said elongated slots extend longitudinally from said inlet portion to said other end of said separation chamber.

3. Apparatus as defined in claim 1, wherein said annular clearance at the lower region thereof includes a portion forming a collecting chamber for said solid particles, said collecting chamber comprising discharge means for discharging the thus collected solid particles from said collecting chamber.

4. Apparatus as defined in claim 3, wherein said discharge means is a worm conveyor.

5. Apparatus as defined in claim 3, wherein said discharge means is a discharge pump.

6. Apparatus as defined in claim 1, wherein said motion imparting means includes a plurality of vanes operative to impart a substantially radially outward motion to said fluid medium to cause the same to move along said substantially helical path thereof.

7. Apparatus as defined in claim 6, wherein said plurality of vanes are helically shaped.

8. Apparatus as defined in claim 6, wherein said motion imparting means includes guide means for guiding said fluid medium into engagement with said vanes.

9. Apparatus as defined in claim 8, wherein said guide means has a cone-shaped circumference, and wherein said plurality of vanes project radially of said cone-shaped of said guide means.

10. Apparatus as defined in claim 9, wherein said plurality of vanes are unitary with said cone-shaped circumference of said guide means.

11. Apparatus as defined in claim 10, wherein said vanes and said guide means are stationary.